United States Patent [19]
Tixier

[11] 3,790,771
[45] Feb. 5, 1974

[54] DIP CORRECTORS FOR HEADLAMPS OF VEHICLES

[75] Inventor: Michel Tixier, Billancourt, France

[73] Assignees: Regie Nationale des Usines Renault, Billancourt; Automobiles Peugeot, Paris, both of, France

[22] Filed: Jan. 10, 1972

[21] Appl. No.: 216,583

[30] Foreign Application Priority Data
Jan. 19, 1971   France .............................. 71.01627

[52] U.S. Cl. ............................ 240/7.1 LJ, 240/62.3
[51] Int. Cl. .............................................. B60g 1/10
[58] Field of Search ............ 240/7.1 LJ, 62.3, 62.4; 91/167, 156, 160; 137/628, 630.15

[56] References Cited
UNITED STATES PATENTS

| | | | |
|---|---|---|---|
| 3,605,557 | 9/1971 | Puster ............................... | 91/167 R |
| 3,453,424 | 7/1969 | Cibie ............................. | 240/7.1 LJ |
| 3,629,570 | 12/1971 | Bouthors ........................ | 240/7.1 LJ |
| 3,634,677 | 1/1972 | Wolffing-Seeug .............. | 240/7.1 LJ |

FOREIGN PATENTS OR APPLICATIONS

| | | | |
|---|---|---|---|
| 1,329,076 | 4/1963 | France | |
| 33,967 | 4/1929 | France ................................ | 240/62.3 |
| 1,438,576 | 4/1965 | France ............................ | 240/7.1 LJ |
| 1,306,590 | 11/1966 | France ............................... | 240/62.3 |

*Primary Examiner*—Joseph F. Peters, Jr.
*Attorney, Agent, or Firm*—Stevens, Davis, Miller & Mosher

[57] ABSTRACT

A vehicle headlamp is pivotally mounted and rigid with an arm connected to the vehicle body through a link and a deformable bellows comprising a plurality of pairs of compartments in which one pair is connected through corresponding pipe lines to a rotary valve. The rotation of the movable member of the rotary valve is controlled by the front suspension through a linkage comprising at least an arm and a link. The other pair of compartments of the bellows is connected likewise through pipe lines to another rotary valve of which the rotary member is responsive to the movements of the rear suspension. With this device, the misadjustment of the headlamp dip due to variations in the trim of a vehicle having a rather flexible suspension system is corrected automatically.

1 Claim, 10 Drawing Figures

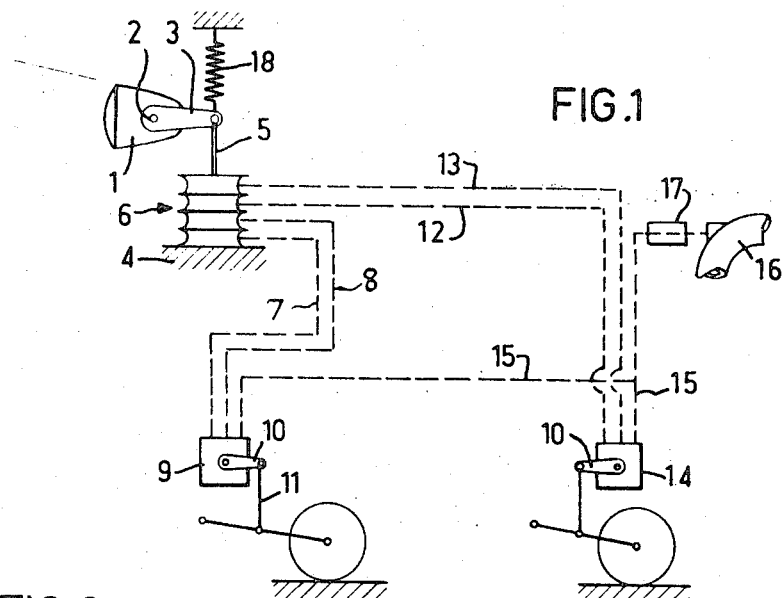
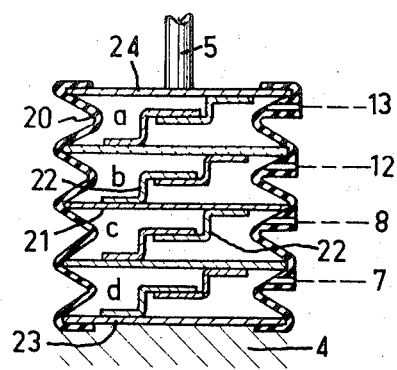
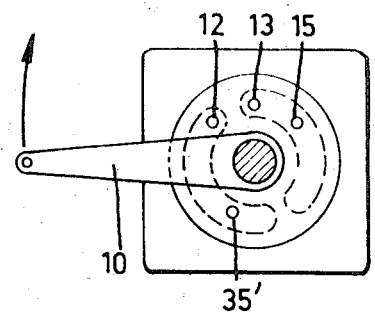
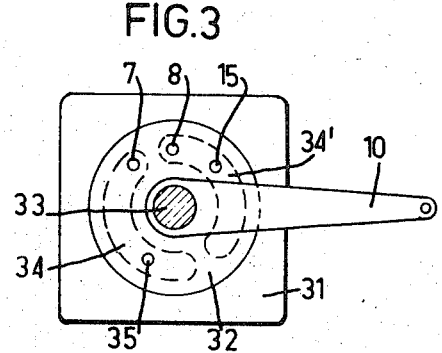
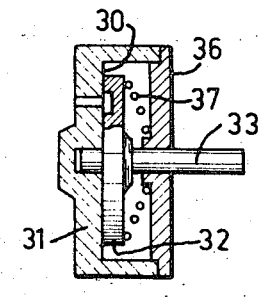

DIP CORRECTORS FOR HEADLAMPS OF VEHICLES

The present invention relates in general to headlamps of motor vehicles and has specific reference to means designed for avoiding or correcting the misadjustment occurring in the headlamp dip as a consequence of variations in the dip of the body of the vehicle, especially in vehicles equipped with a particularly flexible suspension system.

To avoid this misadjustment it is already known to control automatically the headlamp dip or inclination in relation to the vehicle body by means of the front and rear suspension beats through a continuous operative connection between the headlamps and the wheels, this connection being of mechanical, hydraulic or pneumatic character.

Unfortunately, this connection is provided by devices responsive to temperature variations and therefore prone to bring undesired changes in the headlamp dip. In addition, these devices operate under pressure and are frequently liable to detrimental fluid leakages. Finally, the elasticity of the control means, which must be introduced into the system to prevent the headlamps from following all wheel movements, constitutes an obvious source of headlamp vibration or jolts.

It is a primary object of this invention to avoid these inconveniences by providing a device capable of establishing a discontinuous connection between the wheel suspensions and the headlamps.

The device according to this invention comprises variable-volume chambers tending to have their maximum volume under the influence of a resilient return member and their minimum volume under the influence of a depression, a pair of rotary valves each having a plurality of ways for connecting the chambers either to the atmosphere or to a source of pressure other than the atmospheric pressure, the rotation of said rotary valves being controlled by the front suspension in the case of the first valve and by the rear suspension in the case of the other valve, the volumetric variations of said chambers being transmitted through mechanical means to the headlamps so that the dip thereof varies as a function of the volumetric variations.

The continuous vertical movements of the wheels of a travelling vehicle are thus converted into a discontinuous step-by-step movement of the headlamps, and the corresponding "steps" are of course small enough to keep the adjustment within proper limits. To each step there corresponds a well-defined angular position of the headlamps in a vertical plane, in relation to the vehicle body, and any undesired or untimely oscillation of the headlamps about this position is safely precluded due to the absence of a continuous operative connection between the headlamps and the wheels.

This discontinuous transformation of the information received from the wheels, which is attended by a change in the headlamp dip and can be compared with a remote-display effect, may of course be obtained through any suitable and known hydraulic, pneumatic, electrical or other means; however, it must also be completed by a delay action sufficient to prevent it from being disturbed by the movements, such as beats, of the wheels contacting the road unevennesses, this delay action remaining on the other hand short enough to produce the change in headlamp dip as a consequence of movements of the vehicle body proper in relation to the ground or road surface, such as hunting and nose-lifting.

Two typical forms of embodiment of this invention will now be described by way of example with reference to the accompanying drawing, in which :

FIG. 1 is a general diagrammatic view of the system of this invention ;

FIG. 2 is a detail view of the bellows of the system ;

FIG. 3 is a detailed front view of one of the front-wheel rotary valves ;

FIG. 4 is a vertical axial section of front valve of FIG. 3 ;

FIG. 5 is a view similar to FIG. 3 showing a rear wheel valve ;

Figure 6:
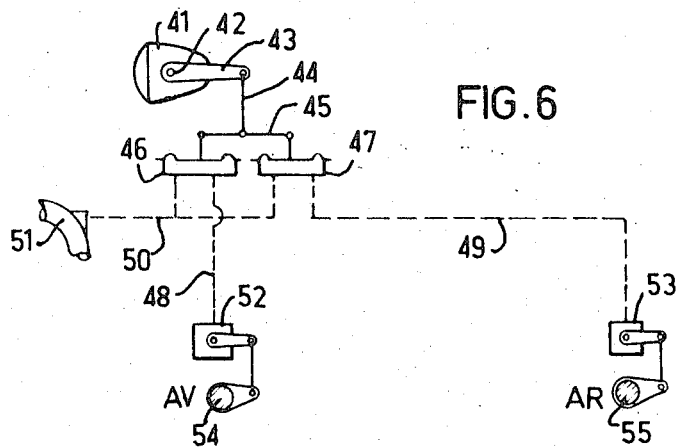
FIG. 6 is a view similar to FIG. 1 showing a modified form of embodiment of the system of this invention.

Referring more particularly to FIG. 1, the dip corrector for headlamps of vehicles according to a first embodiment of the present invention, comprises headlamps 1 pivotally mounted about a transverse horizontal pivot pin 2 and rigid with an arm 3 connected to the body 4 of the vehicle through a link 5 and a deformable bellows 6 comprising a plurality of compartments $a$, $b$, $c$, $d$. Of these compartments, two are connected through pipe lines 7, 8 to a rotary valve or distributor 9, of which the movable member is responsive to the movements of the front suspension due to the interposition of a suitable and known arm and link system or like linkage means 10, 11.

The other pair of compartments of bellows 6 are connected likewise through pipe lines 12, 13 to a rotary valve or distributor 14 responsive to the rear suspension movements. This rotary valve or distributor 14 is mounted in opposition to the relative direction of movement of the front wheels; in other words, when the front wheel rises, the front valve 9 rotates in the counterclockwise direction as seen in FIG. 1, and when the rear wheel rises, the rear valve 14 rotates in the clockwise direction. A pipe line 15 connects the engine induction pipe or manifold 16 to the front and rear valves 9, 14 respectively through a capacity 17. A return spring 18 tensioned between the arm 3 and a fixed point of the vehicle body keeps the link 5 and bellows 6 constantly under tension.

Referring now to FIG. 2, it will be seen that the bellows 6 comprises essentially a pleated membrane 20 retaining in each inner groove or fold thereof a disk-shaped partition 21, these partitions 21 dividing the inner space of the bellows into the above-mentioned four compartments $a$, $b$, $c$ and $d$. Each partition 21 comprises on each face a lug 22 somewhat spaced from this face and co-acting with the registering lug of the adjacent partition, thus permitting a free relative axial movement of these partitions 22 within predetermined limits, in either direction. The end partitions 23 and 24 are connected the former to the vehicle body 4 and the latter to link 5. Suitable ports or nozzles moulded integrally with the membrane 20 permit a convenient connection of the various compartments with the ends of pipe lines 7, 8, 12 and 13, as shown.

FIGS. 3 and 4 illustrate details of a control valve associated with the front wheels of the vehicle. It comprises a body 31 rigidly connected to the body of the vehicle and formed with perfectly polished flat or slide face 30 formed with ports designated in FIG. 3 by the reference numerals of the corresponding pipe lines 7, 8 and 15 leading thereto. A movable valve member or disk 32 rigid with the valve whaft 33 and formed with a pair of kidney-shaped grooves 34, 34' is resiliently urged by a coil compression spring 37 against said slideface 30 so as to connect successively the ports 7 and 8 either with port 15 connected to the engine induction pipe or manifold 16, or to the vent port 35 connected to the external atmosphere.

Of course, the valve shaft 33 is rigid with arm 10 connected in turn to the front wheel suspension as explained hereinabove. The coil spring 37 reacts against a cover 36 closing the valve body 31.

The above-described device operates as follows :

Assuming that the front and rear wheels are in a position corresponding to the middle point of their permissible beat or oscillation.

In this intermediate position it is clear that the front valve 9 connects the chamber c of bellows 6 with the induction manifold 16 via pipe line 8, groove 34' and pipe line 15, while chamber d is vented to the atmosphere via pipe line 7, groove 34 and port 35.

Similarly, the rear valve 14 connects chamber a with the induction manifold 16 by interconnecting pipe lines 13 and 15, and chamber b to the external atmosphere by interconnecting pipe line 12 and port 35'.

Now assuming that under these conditions the front suspension is lowered, for example as a consequence of the addition of load to the front portion of the vehicle. The front valve 9 will be actuated in the counter-clockwise direction and if this movement has a sufficient amplitude the port 7 will be connected via groove 34 to ports 8 and 15, thus connecting chamber d of bellows 6 to the engine induction manifold 16. Thus, the axial dimension of the bellows is reduced and the beams of headlamps 1 are raised to compensate the lower position of the front portion of the vehicle body.

Conversely, if the front suspension is raised, the front end of the vehicle body will rise, thus causing the valve 9 to be actuated in the clockwise direction until the arcuate groove 34 causes port 8 to communicate with ports 7 and 35, thus venting chamber c to the atmosphere. The bellows 6 pulled by spring 18 is extended and the headlamp beams are lowered to compensate the nose-lifting movement of the body.

Regarding the rear end of the vehicle, a similar mode of operation is produced but with a reverse effect.

Thus, a lower level of the suspension is attended by the clockwise rotation of the movable member of valve 14, so that ports 35', 12 and 13 communicate with each other and chamber a is vented to the atmosphere. Consequently, the headlamps are dipped. In contrast thereto, when the rear suspension is raised, chamber b communicates with the induction manifold, thus controlling an upward movement of the headlamp beams.

Obviously, a delay action may be obtained without difficulty, by simply inserting gauged jets in the pipe lines 15 leading to the induction manifold 16, and also in the venting ports 35. On the other hand, and for the sake of safety, the assembly is so arranged that if no negative pressure or vacuum is available as a consequence of engine stoppage the headlamp beams will be dipped automatically.

The above-described arrangement operates by negative pressure with respect to the atmosphere. However, it could also operate under positive pressure conditions, by simply causing the valves 9 and 14 to rotate in the directions opposite to those mentioned hereinabove.

A modified form of embodiment of this invention will now be described with reference to FIGS. 6 to 10 of the drawing.

Figure 7:
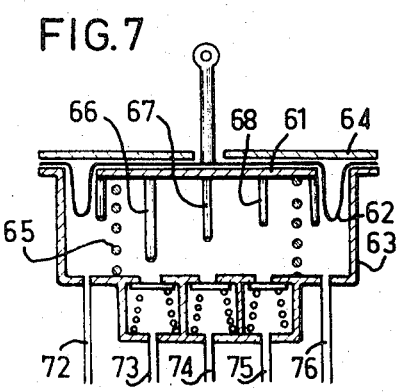
FIGS. 7 and 8 are diagrammatic sectional views of a power unit in two different positions, respectively.

FIG. 6 is a general diagram of the device. The headlamp 41 pivotally mounted at 42 is rigid with an arm 43 connected through a link 44 and a compensation bar 45 to a pair of power units 46 and 47. Power unit 46 corresponds to the front suspension and power unit 47 to the rear suspension; they are both connected via pipe lines 48 and 49 to rotary valves 52 and 53, respectively, of which the rotation is controlled by the oscillations of anti-roll bars 54 and 55. More specifically, the pipes of FIG. 7 are connected to the ports of FIG. 9 as 72 to 85, 73 to 86, 74 to 87 and 75 to 88 while pipe 76 is connected to pipe 50. The negative pressure or depression produced in the induction pipe 51 is applied to the power units 46, 47 via pipe line 50.

In FIG. 7, the power unit 46 is shown in detail and comprises essentially a piston 61 attached to the center of a diaphragm 62 housed in a casing 63 closed by a cover 64. The piston 61 is urged against the cover 64 by a coil compression spring 65. Piston 61 carries a plurality of rods 66, 67 and 68 having different lengths and registering with spring-loaded clap valves 69, 70 and 71, respectively. Pipe lines 76 and 72, open into said casing 63 and pipe lines 73, 74 and 75 into valve chambers 69, 70 and 71, respectively.

Figure 9:
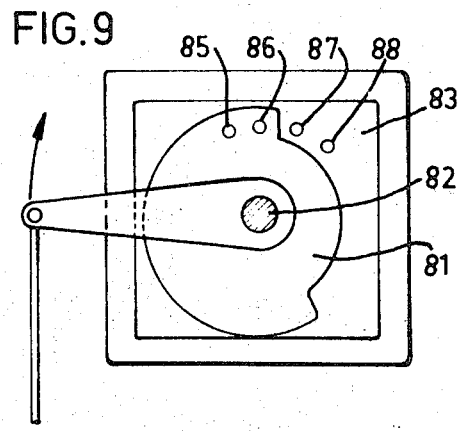
FIGS. 9 and 10 are a side elevational view and a vertical sectional view, respectively, of one of the rotary valves employed in this alternate form of embodiment.
Figure 10:
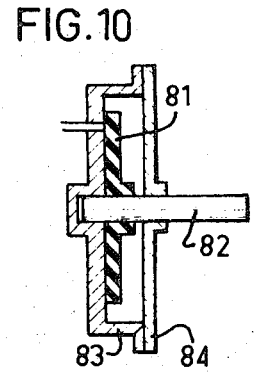

The rotary valve as shown in FIGS. 9 and 10 comprises essentially a disk 81 rigid with a rotary shaft 72 and urged against the inner slide face of a transparent wall of the valve body 83 closed by a cover 84. Ports 85, 86, 87 and 88 open into the casing through the transparent wall and are adapted to be closed by disk 81, according to the angular position thereof.

Figure 8:
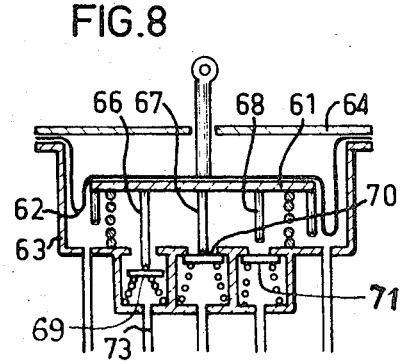

This device operates as follows :

Assuming that in the intermediate position of the suspension the movable member of front valve 52 is in the position shown in FIG. 9. Thus, ports 72 and 73 are closed, and port 76 is connected to the engine depression while ports 74, 75 are connected to the free atmosphere. Therefore, piston 61 is positioned as shown in FIG. 8, i.e., rod 67 engages clap valve 70.

Now let us assume that the front suspension is lowered. Under these condition, the front valve will rotate in the clockwise direction, thus closing port 87 and preventing any fluid circulation in pipe line 74. Piston 61 continues its downward movement since the opening of clap valve 70 by rod 67 discontinues the venting of casing 63, so that the engine depression is still effective, so that the piston 61 movement is continued until rod 68 engages the clap valve 71 which is connected to the free atmosphere through port 88. In other words, previously if clap valve 70 were opened air would enter casing 63 since the clap valve would be connected to the atmosphere via line 74 and port 87. This air would counter balance the engine vacuum in casing 63 which was causing the piston to lower and the rod 67 to open valve 70. However, when disk 81 rotates and closes port 87 to the atmosphere there will no longer be any air entering valve 70 when it is opened by the engine vacuum which lowers the piston and its rod 67. Thus, the axial length of power unit 46 is reduced and the compensation bar 45 and link 44 are lowered, so as to raise the headlamp beams and correct the forward dipping of the vehicle body.

Conversely, when the front end of the body is raised, the front valve is rotated in the counter-clockwise direction.

Thus, port 87 is uncovered so that casing 63 is vented to the free atmosphere via pipe line 74 and clap valve 70 previously opened by rod 67.

Due to the force of spring 65, piston 61 now rises and carries along the power unit 46, compensating bar 45 and link 44, so that the headlamp beams are lowered; when the rod 67 separates from clap valve 70, the latter is closed by its spring.

Another state of equilibrium is thus created as a function of the new values of the engine depression and air flow through pipe line 72 alone.

A similar line of thoughts may be followed for understanding the variations in height of the rear wheel suspension controlling the other power unit 47.

As in the preceding case, any reduction in height of this power unit 47 is attended by an upward movement of the headlamp beams and an increment in the height of power unit 47 is attended by a downward movement of said headlamp beams.

Of course, the above-described forms of embodiment of this invention should not be construed as limiting the present invention since many modifications and variations may be brought thereto without departing from the spirit and scope of the invention. Thus, notably, a liquid under pressure may be substituted for air, and the device may be adapted to any type of suspension whether of the independent wheel type or rigid axle type.

What is claimed as new is:

1. Device for correcting the dip of the headlamps of a motor vehicle comprising discrete variable-volume chambers tending to have their maximum volume under the influence of a resilient return member and their minimum volume under the influence of a vacuum, said chambers being juxtaposed to constitute together a bellows with a spring means constantly urging said bellows to its maximum expanded condition and with two compartments forming a first chamber and two further compartments forming a second chamber, the device further comprising a pipe line connected to the induction manifold of the engine of said vehicle, a first and second rotary valve each having a plurality of means for connecting said chambers to different sources of pressure, a pair of pipe lines connecting said two compartments of said first chamber of said bellows with a pair of ports of said first rotary valve, a second pair of pipe lines connecting said two compartments of the second chamber of said bellows to said second rotary valve, each rotary valve movable among positions connecting each port with the atmosphere and said pipe line connected to the induction manifold of the engine, the rotation of said first rotary valve being controlled by said front suspension and the rotation of said second rotary valve being controlled by said rear suspension, and mechanical means connecting the headlamps to said bellows, whereby said bellows is gradually compressed or expanded to produce a discrete variation in the dip of a headlamp attached to the movable end of said bellows.

* * * * *